United States Patent [19]  [11] 4,260,125
Levine  [45] Apr. 7, 1981

[54] BRACKETS FOR MOUNTING MOTORS

[76] Inventor: Fred Levine, P.O. Box 380876, Miami, Fla. 33138

[21] Appl. No.: 50,503

[22] Filed: Jun. 20, 1979

Related U.S. Application Data

[60] Division of Ser. No. 868,267, Jan. 5, 1978, Pat. No. 4,174,821, which is a continuation-in-part of Ser. No. 692,271, Jun. 3, 1976, Pat. No. 4,076,196.

[51] Int. Cl.³ ............................................... F16M 1/00
[52] U.S. Cl. ....................................... 248/675; 319/91
[58] Field of Search ............... 248/675, 637, 662, 558, 248/676, 300, 287, 674, 560; 310/91, 51, 272, 273, 258, 66

[56] References Cited

U.S. PATENT DOCUMENTS

| 2,920,853 | 1/1960 | Bufogle | 248/287 X |
| 3,432,705 | 3/1969 | Lindtveit | 248/674 X |
| 3,482,127 | 12/1969 | Dochterman | 310/91 X |
| 3,730,469 | 5/1973 | Shields | 248/287 X |
| 3,746,289 | 7/1973 | Johnsen | 248/674 X |
| 3,787,014 | 1/1974 | Story | 248/645 X |
| 3,903,443 | 9/1975 | Carlson | 248/662 X |
| 4,019,704 | 4/1977 | Levine | 248/637 |
| 4,033,531 | 7/1977 | Levine | 248/558 |
| 4,076,196 | 2/1978 | Levine | 248/675 |

Primary Examiner—J. Franklin Foss
Attorney, Agent, or Firm—Clarence A. O'Brien; Harvey B. Jacobson

[57] ABSTRACT

Fan motors, and the like, are mounted to a unit having mounting holes of different spacing from the mounting holes of the fan motor by the use of one or more brackets each constructed around a substantially planar member provided with at least a pair of slots, each of which slots are arranged for attachment to one of the motor and a motor support member of the associated unit. The slots may be of equal or dissimilar lengths and may extend longitudinally either codirectionally and/or perpendicularly with respect to one another, and some of the slots may be arcuate in plan in order to facilitate the mounting of motors having a generally cylindrical housing.

1 Claim, 14 Drawing Figures

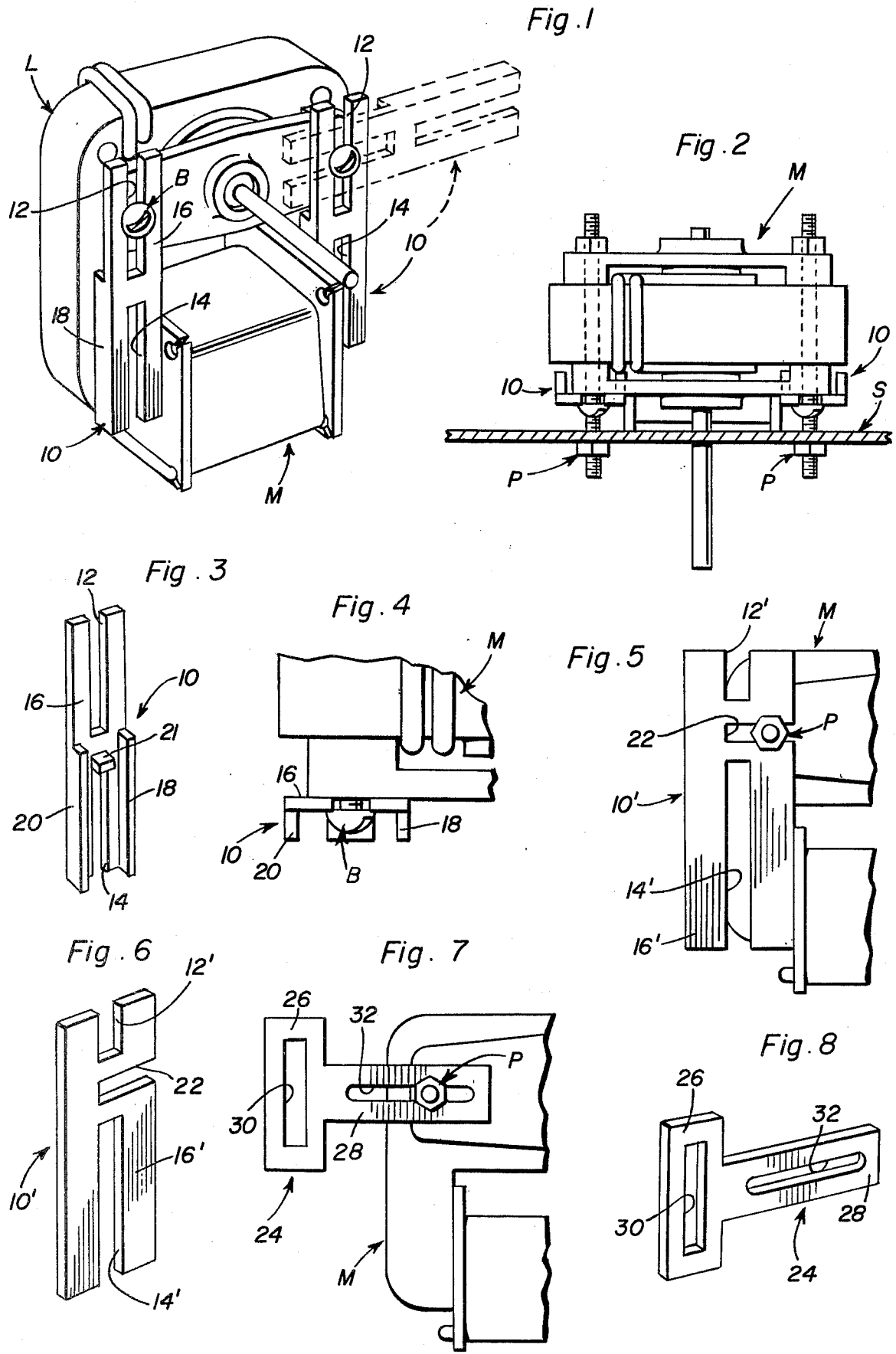

4,260,125

BRACKETS FOR MOUNTING MOTORS

CROSS-REFERENCE TO A RELATED APPLICATION

This is a division of application Ser. No. 868,267, filed Jan. 5, 1978, now U.S. Pat. No. 4,174,821, which was a continuation-in-part of my application Ser. No. 692,271, filed June 3, 1976, now U.S. Pat. No. 4,076,196.

BACKGROUND OF THE INVENTION

1. Field of the Invention

This invention relates generally to the mounting of electric motors, and the like, and particularly to the mounting of replacement fan motors for refrigerators, coolers, and the like, with an electric motor having mounting holes disposed on different centers than the mounting holes of the motor being replaced.

2. Description of the Prior Art

The maintenance of commercial refrigerators, coolers, and the like, frequently requires replacement of the fan motors employed in conjunction with the evaporator of such units, and in similar applications. In this regard, a problem has developed inasmuch as although the replacement motors are generally of a single type having a commonly employed standard distance between the centers of the mounting holes of the motor, the mechanics frequently encounter units having fan motors provided with mounting holes spaced on a different standard. Thus, the usual replacement motor cannot be installed in such units without some sort of adaptation being made or new mounting holes being drilled.

The brackets disclosed in my copending application Ser. No. 692,271, filed June 3, 1976, were developed specifically for the repair and replacement field, where each component can be made to fit the requirements of a particular motor available on the market, so that any given motor can be used in any unit encountered by maintenance people out in the field. Such mounting brackets are particularly necessary when, as often happens, the original motor or other item used in the unit is not available to the personnel making repairs to the unit.

SUMMARY OF THE INVENTION

It is an object of the present invention to provide a kit of mounting brackets which will supplement those disclosed in my copending application Ser. No. 692,271, and which will permit for greater versatility and convenience in the adaption of various motors, including motors having housings of round, oval and other similarly shaped cross sections, in a variety of sizes to different units encountered for repair and/or replacement.

It is another object of the present invention to provide mounting brackets which can be employed either inside of or outside of motors having cylindrical housings, and the like.

Yet another object of the present invention is to provide mounting brackets which can be easily slid in under bolt heads and nuts without the necessity of removing the bolts and nuts from the associated unit.

These and other objects are achieved according to the present invention by providing motor mounting brackets each built around a substantially planar member provided with a pair of slots, each of which slots is arranged for attachment to one of a motor and a motor support member of the unit on which the motor is to be mounted.

According to a preferred embodiment of a bracket according to the present invention, the planar member extends longitudinally so as to define longitudinally spaced ends, and the slots provided in the member are provided in the ends of the member, one to each end, with the slots extending longitudinally toward one another of either substantially equal or completely unequal lengths. The planar member can also be provided, in a modification of the first embodiment of a bracket according to the invention, with a further slot arranged extending transversely of and between the pair of slots which extend from the ends of the planar member, with the further slot extending from one of the peripheral sides of the planar member such that any of the three slots can be slid under the head of a bolt or nut with which the bracket is to be associated. Further, this basic embodiment of the invention contemplates the use of legs extending along the extent of at least one of the slots extending from a longitudinally spaced end of the planar member so as to form a space for receiving the head of a bolt, and the like.

According to a second preferred embodiment of a bracket according to the present invention, the planar member is substantially T-shaped in the plane of the member so as to form a head portion and a leg portion of the member, with one of the slots provided in the planar member being disposed in the leg portion and the other of such slots disposed in the head portion. By this arrangement, the slots are arranged with longitudinal extents thereof extending perpendicularly with respect to one another. The slots can also be at least three in number and open at respective ends of the leg portion and head portion, with two of the slots being disposed in the head portion and extending along a common axis. Further, the head portion of the T-shaped member can be semi-circular in the plane of the member, with a pair of arcuate slots being provided in the head portion of the member, with a hole being arranged between the arcuate slots at the junction of the head portion with the leg portion of the planar member. By the latter arrangement, the mounting of motors having generally cylindrical housings is greatly facilitated, inasmuch as the T-shaped brackets having substantially semi-circular head portions can be arranged either inside of or outside of the circular circumference of the housing as the situation demands.

It will be understood that the head portion of the latter mentioned embodiment of the invention can take other curved configurations, such as a segment of an oval, as desired for the mounting of various types of standard motors.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic, perspective view showing a first embodiment of a bracket according to the present invention mounted on an electric motor of generally square configuration.

FIG. 2 is a top plan view, partly cutaway and in section, of the motor and bracket seen in FIG. 1 mounted upon a supporting panel of a unit with which the motor is to be associated.

FIG. 3 is a perspective view showing the brackets of FIGS. 1 and 2 in reverse orientation from FIG. 1.

FIG. 4 is an enlarged, fragmentary, top plan view showing the bracket of FIGS. 1 through 3 mounted on a motor in the reverse orientation from the mounting of the bracket seen in FIGS. 1 and 2.

FIG. 5 is a fragmentary, front elevational view showing a modification of the embodiment of the invention seen in FIGS. 1 through 4.

FIG. 6 is a perspective view showing the bracket of FIG. 5.

FIG. 7 is a fragmentary, front elevational view showing a second embodiment of a bracket according to the present invention mounted on a motor similar to that seen in FIG. 1.

FIG. 8 is a perspective view showing the bracket of FIG. 7.

Figure 9:
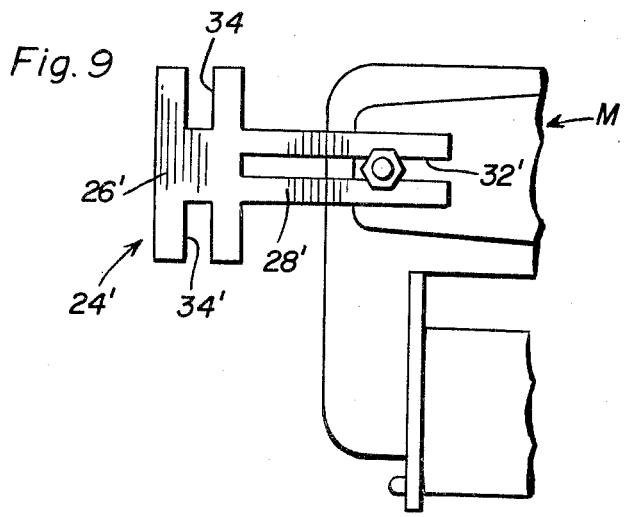

FIG. 9 is a fragmentary, front elevational view, similar to FIG. 7, but showing a modified form of the second embodiment of a bracket according to the present invention.

Figure 10:
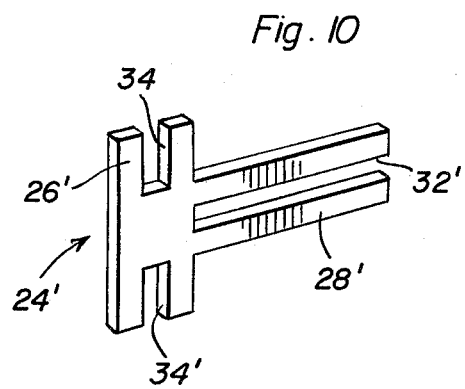

FIG. 10 is a perspective view showing the bracket of FIG. 9.

Figure 11:
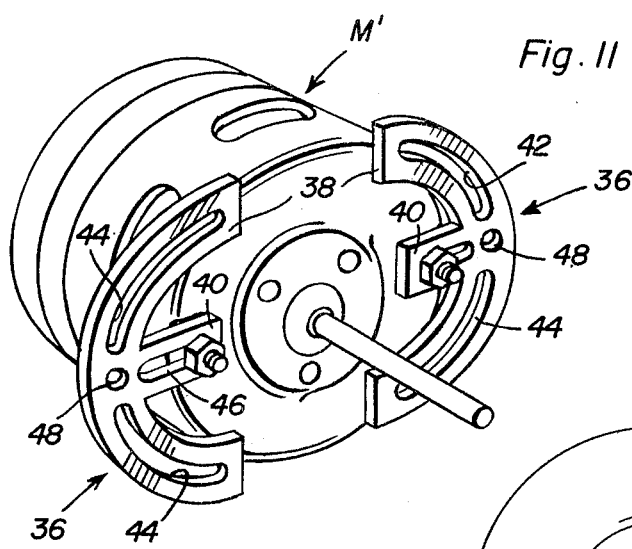

FIG. 11 is a partly schematic, perspective view showing a third embodiment of a bracket according to the present invention mounted on an electric motor having a substantially cylindrical housing, with the brackets being disposed outside of the periphery of the housing.

Figure 12:
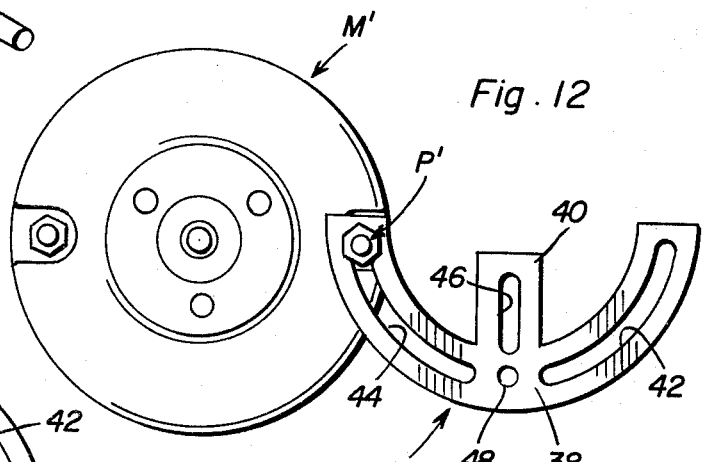

FIG. 12 is a partly schematic, front elevational view, showing the motor and one of the brackets seen in FIG. 11, but with the bracket mounted in a different orientation, although still outside the periphery of the housing of the motor.

Figure 13:
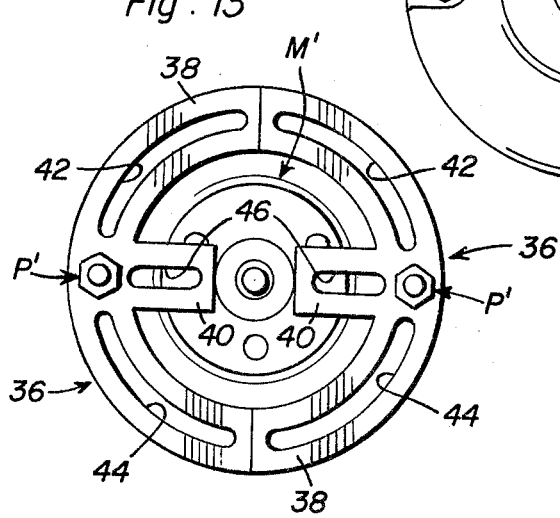

FIG. 13 is a partly schematic, front elevational view, showing the brackets of FIG. 11 mounted within the periphery of the housing of the associated motor.

Figure 14:
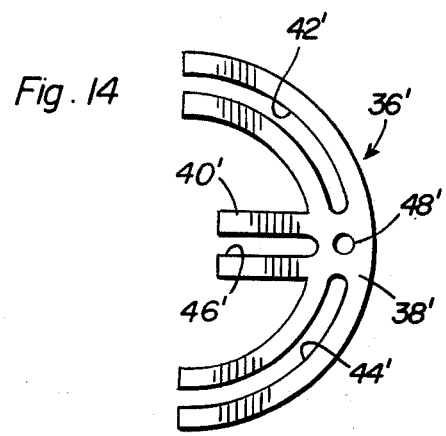

FIG. 14 is a plan view showing a modified form of the bracket seen in FIGS. 11 through 13.

DESCRIPTION OF THE PREFERRED EMBODIMENTS

Referring now more particularly to FIGS. 1 through 4 of the drawings, a replacement fan motor M, and the like, is illustrated as formed by a body which can be constructed in a conventional manner from a plurality of ferrous lamination L forming a core for the motor. The body of motor M is provided, as is conventional, with a plurality of mounting holes which receive bolts B and studs P for attaching brackets according to the invention to the core of the motor M.

It is to be understood that while each of the several brackets according to the invention shown in the drawings is illustrated as being used individually to mount a motor such as motor M, the various brackets according to the invention can be used in any combination with one another as necessary to accomplish a specific motor mounting situation and, therefore, these brackets are contemplated as being packaged in various numbers of each as kits to be taken into the field by maintenance personnel.

Bracket 10, as seen in FIGS. 1 through 4, includes a pair of slots 12 and 14 each provided in a substantially planar member 16 and arranged for attachment to one of motor M and a motor support member S, which member S forms part of a conventional refrigeration unit, and the like, and will not be described in greater detail herein. Planar member 16 extends longitudinally so as to define a pair of longitudinally spaced ends, and the slots 12, 14 are provided in these longitudinally spaced ends of member 16, one to each of the ends, and extend longitudinally toward one another along a common axis. Although the slots 12 and 14 are illustrated in FIGS. 1 through 4 as being of substantially equal length, it is to be understood that they may be of different lengths, if desired. Further, planar member 16 is illustrated as having a pair of legs 18 and 20 extending codirectionally and perpendicularly from peripheral side portions of the longitudinal extent of member 16, with the legs 18 and 20 extending only along the extent of the slot 14. A tab 21 is preferably formed at the head, or terminal, end of slot 14 so as to form an abutment for the hexagonal head of a bolt B or the hexagonal nut mounted on a stud P in order to facilitate installation of a motor M employing the bracket 10. As can be appreciated, the open ends of the slots 12 and 14 permits the bracket 10 to slide under a bolt head or nut without removing the bolt or nut from the associated unit or motor, while the provision of legs 18 and 20 along only approximately one-half the longitudinal extent of member 16 will permit member 16 to be placed under a bolt head as on a bearing bracket without raising the bolt head a great distance and making the motor mounting unnecessarily bulky. Bracket 10 can be rotated to any orientation desired, an example of which is indicated by the broken line showing in FIG. 1, and a combination of two or more brackets 10 can be employed to reach further beyond the perimeter of motor M. Further, bracket 10 can be mounted from either end on a motor M, or associated bearing bracket, and can be turned over from the position shown in FIGS. 1 and 2, as seen in FIG. 4, so that the open side of member 16, or the side associated with legs 18, 20, is directed outwardly and the flat or planar surface of member 16 is disposed abutting against the body of motor M, or against the bearing bracket of motor M.

While bracket 10 is illustrated as a single piece, it is to be understood that it could be split longitudinally down the middle in a manner not shown and joined together by the bolt heads or nuts of the fasteners employed for mounting the motor M to the bracket, and for mounting the bracket to the support member S, with the resulting "H-shape" thus being formed.

Referring now more particularly to FIGS. 5 and 6 of the drawings, there is illustrated another H-shaped bracket 10' which is similar to bracket 10, but does not have any legs, such as legs 18 and 20, and has slots 12' and 14' of substantially unequal lengths. Further, bracket 10' is provided with a further slot 22 arranged extending transversely of and between the slots 12' and 14' from the one of the peripheral sides of planar member 16'. By this arrangement, as is shown in FIG. 5, bracket 10' can be mounted on a motor M by use of a stud P and in an orientation which would not be permitted by provision of the slots 12' and 14' alone, and adds greater flexibility to the resulting bracket. It is to be understood that bracket 10' could be provided with legs, such as legs 18 and 20, if desired, and that the relative lengths of the slots 12' and 14' can vary from those relative lengths illustrated.

FIGS. 7 and 8 disclose a bracket 24 the planar member of which is T-shaped in the plane thereof so as to form a head portion 26 and a leg portion 28 extending perpendicularly to one another. A slot 30 is provided in head portion 26 and a slot 32 in leg portion 28, with the slots 30 and 32 being arranged extending longitudinally substantially perpendicularly to one another. As a variation to the bracket 24 seen in FIGS. 7 and 8, a bracket 24' is illustrated in FIGS. 9 and 10 which includes three slots open at the terminal end thereof. More specifically, head portion 26' of bracket 24' is provided with a pair of slots 34, 34' extending along a common axis toward one another from the longitudinally spaced ends of head portion 26', while a slot 32' extends longitudinally from the free end of the longitudinally extending leg portion 28' of the bracket 24'. It will be appreciated that the differences and advantages of the bracket 24' as compared to the bracket 24 are similar to those distinctions between bracket 10 and bracket 10'. Further, brackets 24 and 24' can be used in positions other than those shown in FIGS. 7 and 9 as necessary, and it is to be understood that brackets 24 and 24' may be used in combination with one another and with the brackets 10 and 10' as circumstances dictate.

A bracket 36 is shown in FIGS. 11 through 13 of the drawings which has a planar member in T-shape so as to form a head 38 having a substantially semi-circular, or other curved, configuration in the plane of the member, and a leg 40 extending from a central point of the curved portion so as to provide symmetrical arms to the head portion 38. There are three slots 42, 44 and 46 provided in the planar member of bracket 36, with the slots 42 and 44 being arcuate slots provided in the arms of the head portion 38, which slots 42 and 44 extend away from a hole 48 provided also in head portion 38 at the juncture thereof with the leg portion 40. As can be seen from FIGS. 11 through 13, the brackets 36, which are usually used in pairs, can be mounted either extending outwardly of the periphery of a motor M', which can be of a conventional construction having a substantially circular or oval housing, or can be disposed totally within the housing of the motor M' as is seen in FIGS. 11 and 13, respectively. Further, as seen in FIG. 12, one of the symmetrical arms can be attached to the housing of motor M' so that the head portion 38 of bracket 36 extends longitudinally away from the motor M'. In addition, as mentioned above as regards the brackets 10, 10' and 24, 24', the brackets 36 can be employed in various combinations with one another and with the other brackets according to the invention.

FIG. 14 shows a bracket 36' similar to bracket 36, but having open-ended slots 42', 44' and 46' disposed in head portion 38' and 40', respectively. It will be appreciated that the construction of bracket 36' distinguishes it from bracket 36 as regards intended uses in a similar manner as bracket 10' distinguishes from bracket 10 and bracket 24' distinguishes from bracket 24.

As can be readily understood from the above description and from the drawings, brackets according to the present invention can be provided in various combinations and numbers in kits taken into the field by maintenance and repair personnel for the mounting of various available replacement motors into whatever manufacturer of refrigeration and similar units which may be encountered in the field in order to readily make replacements without the need of obtaining additional parts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a fan motor including a housing provided with mounting holes, a kit for relocating mounting holes of the fan motor in order to adapt the fan motor to a unit having mounting holes of different spacings than the mounting holes of the fan motor, the kit comprising, in combination: a first bracket including a longitudinally extending member having a substantially planar major surface and having two longitudinally spaced ends, two laterally spaced sides extending continuously from one end to the other, and said sides being interconnected at at least one point between said ends, a second bracket including a planar member which is T-shaped in configuration and includes a head portion and a leg portion, and having one slot being disposed in the leg portion and another slot in the head portion, the slots being longitudinally extending slots arranged extending substantially perpendicular with respect to one another, and a third bracket including a planar member which is generally T-shaped in configuration and includes a head portion curved in the plane of the member and having a leg portion extending substantially from the mid point of the curved head portion, there being three slots provided in the planar member, with two of the slots being curved slots provided in the head portion of the member and the other of the slots being provided in the leg portion of the member, with each of the first bracket, second bracket, and third bracket being usable individually or in combination with any other bracket.

* * * * *